P. E. WIRT.
TIRE CONSTRUCTION.
APPLICATION FILED JAN. 13, 1909.
951,871.
Patented Mar. 15, 1910.
5 SHEETS—SHEET 5.
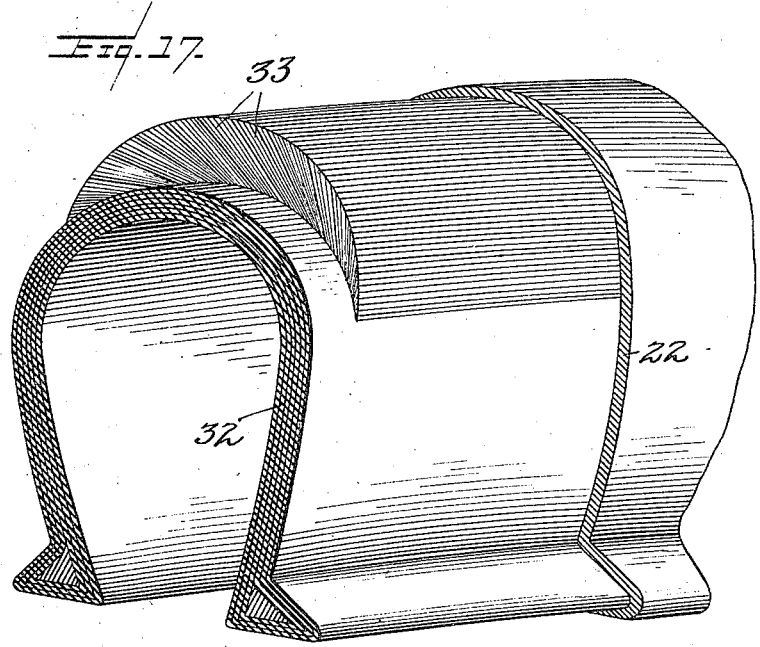
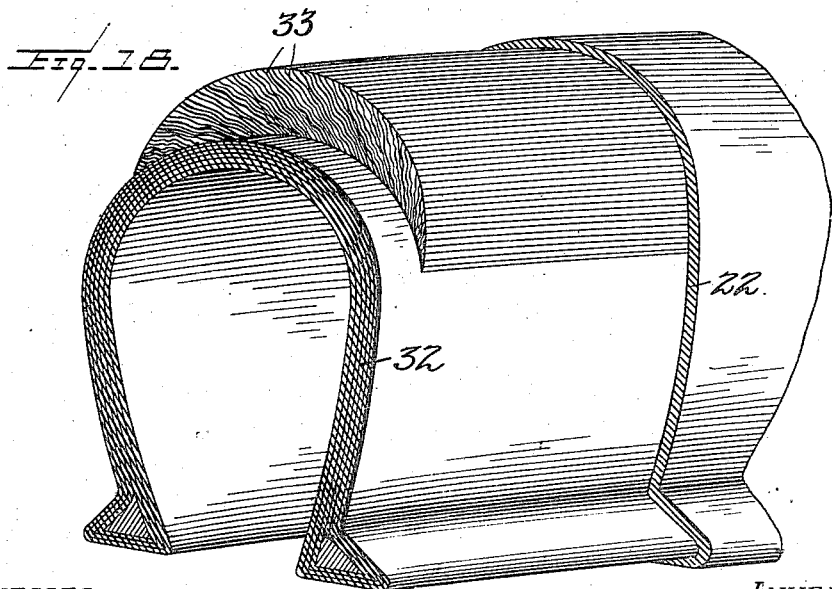

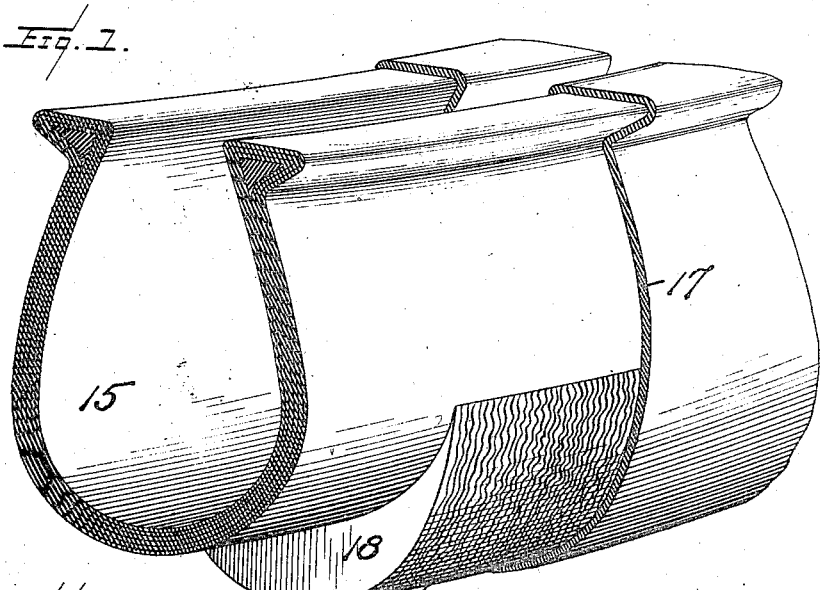

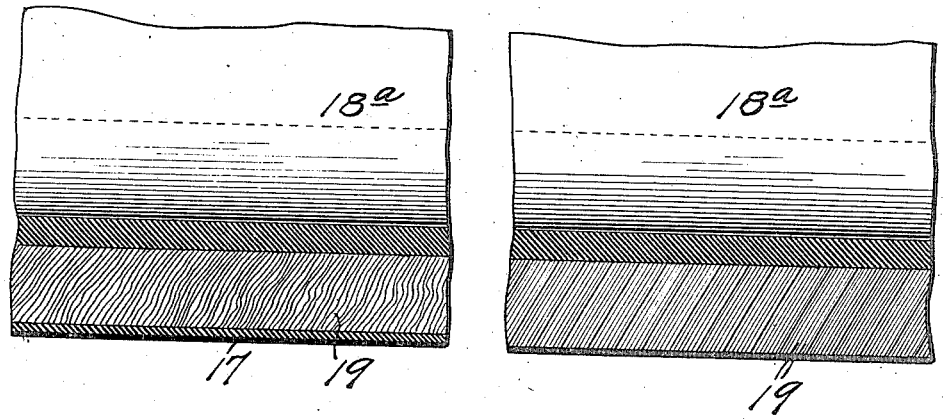
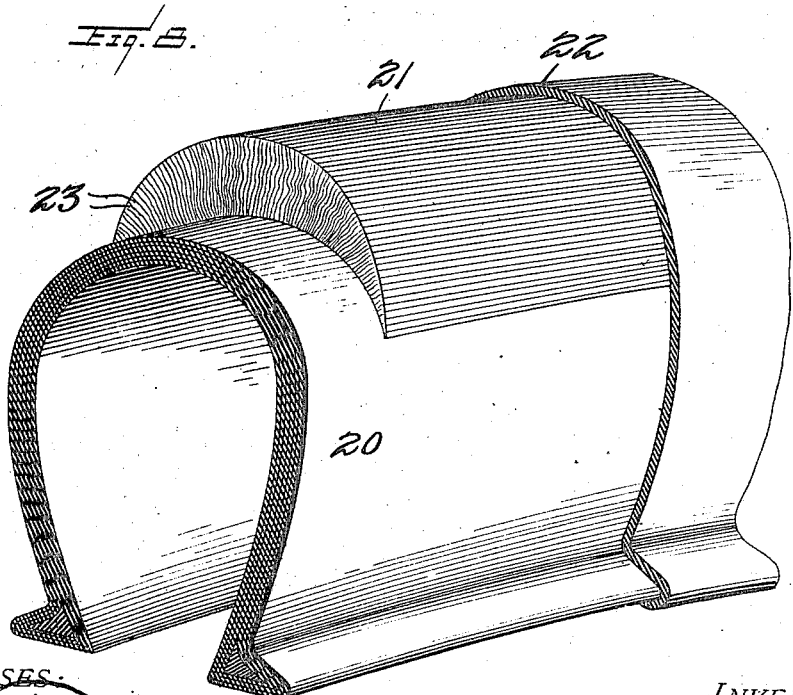

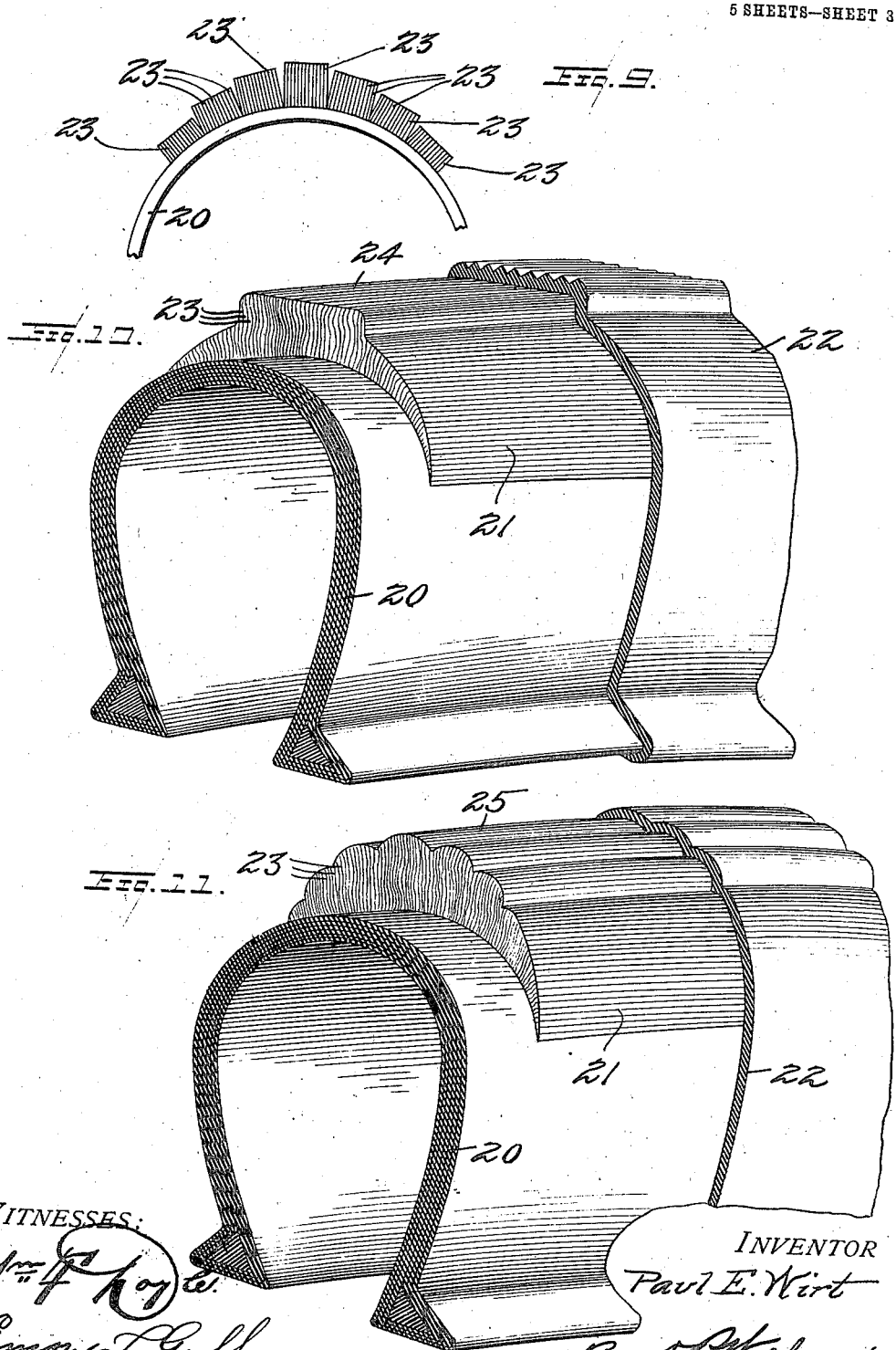

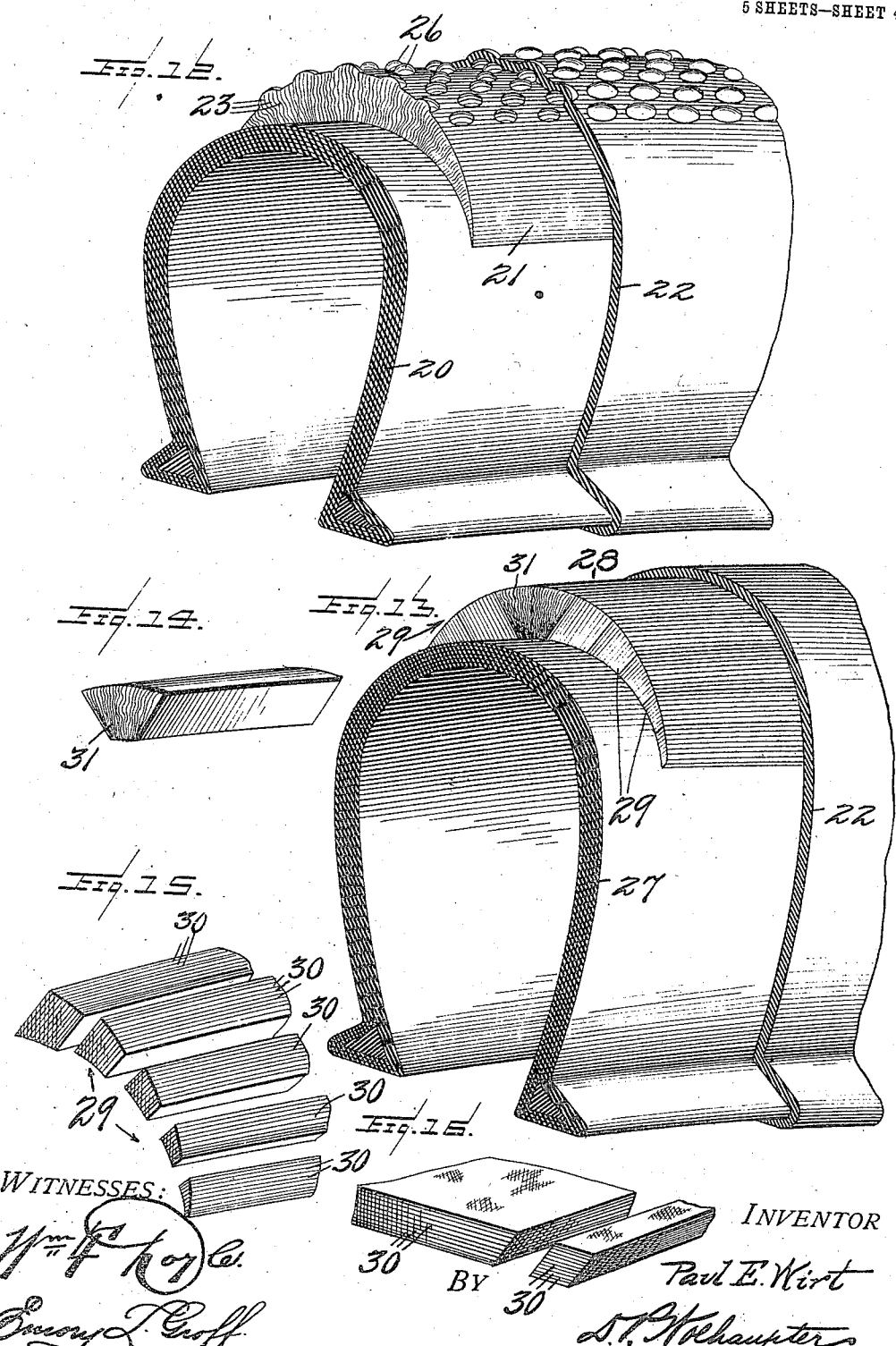

UNITED STATES PATENT OFFICE.

PAUL ESTERLY WIRT, OF BLOOMSBURG, PENNSYLVANIA.

TIRE CONSTRUCTION.

951,871.  Specification of Letters Patent.  Patented Mar. 15, 1910.

Application filed January 13, 1909. Serial No. 472,126.

*To all whom it may concern:*

Be it known that I, PAUL E. WIRT, a citizen of the United States, residing at Bloomsburg, in the county of Columbia and State of Pennsylvania, have invented certain new and useful Improvements in Tire Construction, (Case D,) of which the following is a specification.

This invention relates to vehicle tires, and more particularly to laminated tires of the type disclosed in, and covered by, the claims of co-pending applications filed September 12, 1907, Serial Nos. 392,462 and 392,463.

One of the primary objects of the present invention is to improve the tread portion of the tire by providing broken and irregular joints between the forming units so that articles which may enter the tire structure must rupture and pass through various layers of fabric, and cannot follow or be directed into and through the joints between the units.

Another and important object is to provide a structure of the above character, while still retaining the disposition of units in which the tread surface is made up of edges of rubberized fabric with all the advantages incident to such an arrangement.

Still another object of importance is the provision of a tire in which, while the outer edges of the fabric are presented at the tread surface, the material itself is diagonally disposed thereto, insuring the location of a plurality of thicknesses of fabric across all possible paths by which articles may be forced into the tire.

Embodiments of the invention that are at present considered preferable are illustrated in the accompanying drawings and are described in the following specification.

It will be evident from an inspection of the claims hereto appended that the invention is not limited solely to the structures disclosed.

In the drawings: Figure 1 is a perspective view of a portion of a tire illustrating one form of construction. Fig. 2 is a longitudinal sectional view through the same. Fig. 3 is a similar view prior to the crushing of the forming units. Fig. 4 is also a perspective view of a portion of a tire, but illustrating a slightly different arrangement of the units. Fig. 5 is a detail perspective view of a series of the forming units disclosed in Fig. 4. Fig. 6 is a longitudinal sectional view of the structure disclosed in Fig. 4. Fig. 7 is a view similar to Fig. 6, but illustrating the parts prior to the crushing of the units. Fig. 8 is a detail perspective view of a modified form of construction. Fig. 9 is a cross sectional view through the same prior to the crushing of the units. Figs. 10, 11, and 12 are detail views of other embodiments of the invention. Fig. 13 is a detail perspective view of a form of construction that is considered of particular importance. Fig. 14 is a detail perspective view of the key set of units. Fig. 15 is a similar view of one of the side sets. Fig. 16 is a view illustrating the manner in which the said sets are produced. Fig. 17 is a sectional perspective view of another form of construction that may be utilized in carrying forward the invention, and illustrating the forming units in a plain uncrushed condition. Fig. 18 is a cross sectional view of the same form of construction but illustrating the units crushed for the purpose herein fully set forth.

Similar reference numerals designate corresponding parts in all the figures of the drawings.

Taking up first a simple embodiment of the invention, as disclosed in Figs. 1, 2, and 3, the body portion of the tire, which is designated 15 may be of any well known character, and located thereon is a tread portion 16 which may be covered by a covering 17 of soft rubber. It will be observed that the tread portion is formed of a plurality of crescent-shaped forming units 18, preferably of rubberized fabric, these units being located side by side and closely compacted. They may extend around the body portion 15 any distance desired, and when placed in associated relation, the said units are substantially flat. Moreover, it will be observed that the units are disposed perpendicularly to the surface of the body, or, in other words, at right angles to tangential lines of said body. Ordinarily therefore the joints between them would be radial and straight so that an article forced into the tire tread might follow one of said joints and cause a puncture. To overcome this, in the present form of construction, the forming units are crushed inwardly or edgewise, transversely of their width, as will be clear by reference to Fig. 2; thereby completely breaking the joints and making them so irregular that an article cannot follow the joints, but must rupture and pass through a number of layers of the fabric, which offer great resistance to such passage.

Instead of the radial or right angular arrangement of the forming units as above described, said units may be located at an inclination, and such an embodiment of the invention is disclosed in Figs. 4, 5, 6 and 7. In this form of construction the body portion of the tire is designated 18ª and the units 19. These units are crescent shaped as before, but a series of them may be cut at once from a pack or pile of sheets as explained in my co-pending application, filed January 13, 1909, Serial No. 472,127. Such cuts are made at an inclination or diagonally; consequently, when the units are placed together upon the body, as shown most clearly in Fig. 7, they assume an inclined relation. After being so positioned they are compressed or crushed edgewise and inwardly, thereby breaking the joints and making them irregular as disclosed in Fig. 6.

In connection with the formation of the units, it may be well at this point to briefly state that they are formed from superimposed rubberized sheets of fabric, or other desired material, or alternate sheets of fabric or other material with thin sheets of vulcanized rubber to any desired thickness. I prefer to build up the thickness to one-half or three-fourths of an inch, and then pressing or rolling the whole well together, so that they adhere and at the same time eliminate air between the sheets. The crescent-shaped sections are cut on the bias out of the laid up material, if in fabric, so that ends of threads as nearly as possible may be presented at the wearing surface of the strips or the crescents. This is done by cutting the laid-up material into slabs or pieces of the desired width, and on the bias. This diagonal cutting is important in this construction for purposes fully stated in my co-pending applications.

Referring to Figs. 8-12 inclusive, a tire body 20 of any suitable character is employed, and located thereon is a tread portion 21 covered by a soft rubber covering 22. In each of these forms of construction, the tread portion consists of separate forming units 23 closely compacted side by side but disposed longitudinally around the body portion, the whole producing a member that is in the form of a crescent in cross section. These units are formed of rubberized fabric, and they are also crushed edgewise to break the joints and make said joints very irregular. The configuration of the outer surface of the tread portion can be varied to a considerable extent. Thus, in Fig. 10 the outer part is thickened so as to produce a substantially flat surface 24. In Fig. 11, the said portion has longitudinally disposed ribs 25 producing a transversely scalloped formation, while in Fig. 12 bosses 26 are produced. The outer covering 22 in each instance is made to conform generally to the configuration of the outer face of the tread portion. In producing this type of longitudinal structure, the units are also preferably made in sets, as shown in Fig. 9, said sets being applied to the body portion 20 and then compacted and crushed as above described.

One of the most desirable embodiments of the invention is disclosed in Figs. 13-16 inclusive. In this embodiment, the body portion of the tire is designated 27, and located thereon is a tread portion 28. This tread portion is composed of side sets 29 of forming units preferably produced, as illustrated in Fig. 16, that is to say, a number of sheets of rubberized fabric 30 are packed together, and from the same are cut strips which produce the sets 29, the cuts being diagonal. It will thus be seen by reference to Fig. 13 that the said side sets while extending longitudinally about the tire body, have their units extending laterally in opposite directions, presenting edges to the tread surface and yet having the sheets of fabric disposed transversely to the path that must be taken by an instrument or article inserted into the tire. This opposite disposition produces at the center or crest of the tire a tapered channel or key seat, and the necessarily wedge-shaped space left at the middle of the face of the tread after sides of tread have been built up, is filled by placing therein a strip, section, or key set 31 whose laminations are crushed, rolled or pressed out of a strip of the tread material in such manner as to assume the shape of the space to be filled or covered, such crushing or rolling throwing laminations out of their perpendicular or doubling them over in the manner shown to make this filling section conform to the proper shape, and also to provide therein a construction that will best resist puncture. This last mentioned section is so formed by pressing in a form of proper shape, or by passing the straight cut strip of tread material between rolls with the proper recess to give shape, size and form required. The same tread material is used as heretofore described and the tread is built up in cores or strips of the material laid longitudinally around the wheel upon the casing. There is this difference, however: The strips, all excepting the one in middle, are cut diagonally from tread material, so that while edges of material or fabric are presented to the wearing surface of the tread the flat surfaces of the units, or surfaces of each lamination, are placed and held so as to present the greatest resistance to puncture, et cetera.

As herein explained, one of the distinguishing and practical features of the present ent invention resides in building up a tread structure wherein the forming units thereof are crushed inwardly or edgewise, thus breaking the joints between the units and making them irregular for the purpose of securing the functions pointed out. This feature of compressing or crushing the units edgewise or inwardly may obviously be employed with units of different designs and differently arranged, and for purposes of exemplification, the drawings illustrate forming units of crescent form arranged transversely of the tire body, and other units in strip form arranged longitudinally of and about the tire body. The longitudinal arrangement of the forming units about the tire body possesses structural advantages of importance, and in order to further exemplify this phase of the invention, there is shown in Figs. 17 and 18 of the drawings another modification of the invention, involving the idea of arranging the forming units longitudinally around the body portion of the tire. However, a distinctive feature of the form of construction suggested in Figs. 17 and 18 of the drawings resides in a plan of construction wherein the blocks or sets of flexible forming units are not only disposed circumferentially and longitudinally about the tire body, but also so arranged as to project laterally therefrom all in one, or the same general, direction. More specifically speaking, the arrangement of the forming units shown in Figs. 17 and 18 may be said to project tangentially or approximately tangentially from the tire body all in the same direction, instead of laterally outward in opposite directions, as suggested for instance in the construction shown in Fig. 13 of the drawings. This form of construction, that is the tangential arrangement of the units all in one direction, presents a very effective, non-puncturable tread surface wherein there is a multiple overlapping of units or sets of units in such a manner as to greatly resist puncture. Hence, it will be obvious that this arrangement of the forming units as well as similar or corresponding forms of the invention, may well be utilized with or without the crushing feature, and still remain within the general purview of the present invention.

In the modified construction shown in Figs. 17 and 18 of the drawings, the tire body is designated by the reference number 32, and the tangentially arranged sets of forming units by the reference number 33.

It is to be understood that in this application no claim is made to the process or method of producing the tire or the elements thereof, as the same constitutes the subject matter of application filed January 13, 1909, Serial No. 472,127.

I claim:

1. A tire including a plurality of flexible forming units disposed side by side and crushed in the direction of their width.

2. A tire including a plurality of flexible forming units disposed side by side and having outer edges presented at the tread portion of the tire, said units being crushed edgewise in the direction of their width.

3. A tire including a plurality of flexible forming units of sheet-material adhesively compacted in face to face relation and having the line of contact between them broken and irregular.

4. A tire including a plurality of separate closely compacted forming units, said units being disposed side by side and crushed together.

5. A tire including a plurality of separate closely compacted forming units formed of rubberized fabric and disposed side by side, said units having their outer edges presented at the tread portion of the tire and being furthermore crushed together in a direction transversely of their width.

6. A tire comprising a body portion and a tread portion located thereon and including a plurality of flexible forming units closely compacted side by side and crushed together transversely of their widths.

7. A tire comprising a body portion and a tread portion located thereon and including a plurality of forming units of rubberized fabric located side by side and crushed together transversely of their widths.

8. A tire comprising a body portion and a separate tread portion on the latter, said tread portion consisting of a plurality of flexible forming units extending longitudinally of the body, said forming units being constructed from sheet-material and adhesively compacted in face to face relation with their outer edges presented toward the wearing surface.

9. A tire comprising a body portion and a separate tread thereon, said tread consisting of a plurality of flexible forming units of rubberized fabric sheets adhesively compacted in face to face relation and successively and uninterruptedly laid on edge upon the body, said units extending longitudinally about the latter.

10. A tire comprising a body portion and a tread portion located on the body portion and consisting of a plurality of flexible forming units located side by side and disposed longitudinally of said body portion, said tread portion being compressed edgewise and having the joints between the units broken and irregular.

11. A tire comprising a body portion and a tread portion located on the body portion and comprising a plurality of flexible forming units of rubberized fabric closely compacted side by side and disposed longitudinally of the body portion, said tread portion being compressed edgewise and having the joints between the units broken and irregular.

12. A tire including a plurality of flexible forming units located side by side, certain of said units being crushed together and having the joints between them thereby broken and irregular.

13. A tire including a plurality of sets of flexible forming units located side by side, one of the sets of said units being crushed together and having the joints between said units irregular.

14. A tire comprising a body portion and a tread portion including sets of longitudinally disposed flexible forming units of rubberized sheet-material extending around the body portion and projecting outwardly in opposite directions, and a key section located between said sets and projecting outwardly with the outer edge thereof forming the crest of said tread portion.

15. A tire comprising a body portion and a tread portion including sets of longitudinally disposed flexible forming units of rubberized sheet-material extending around the body portion and projecting outwardly in opposite directions, and a central set of forming units located between said first mentioned sets and set edgewise, the line of contact between the latter set being broken and irregular.

16. A tire comprising a body portion and a tread portion, said tread portion consisting of sets of longitudinally disposed flexible forming units extending around the body portion and projecting outwardly in opposite directions, and a key set of forming units located between said first mentioned sets and set edgewise, the units of the key set being crushed inwardly and having their joints broken and irregular.

17. A tire comprising a body portion and a tread portion surrounding the body portion, said tread portion consisting of longitudinally disposed flexible forming units of rubberized fabric projecting laterally outward in opposite directions, and a central key set of corresponding units located between said first mentioned sets, the units of the key set being set edgewise and said units being crushed inwardly to produce broken and irregular joints between them.

18. A tire comprising a body portion and a separate tread thereon, said tread consisting of a plurality of soft forming units of rubberized sheet-material laid on edge upon the body in face to face contact, said tread having a wedge shaped channel at its crest, and a set of the said forming units keyed in said channel.

In testimony whereof I hereunto affix my signature in the presence of two witnesses.

PAUL ESTERLY WIRT.

Witnesses:
KARL F. WIRT,
R. L. ORANGE.